United States Patent [19]
Irwin

[11] Patent Number: 5,976,050
[45] Date of Patent: Nov. 2, 1999

[54] AXLE SHAFT BALL RETAINER

[75] Inventor: Earl James Irwin, Fort Wayne, Ind.

[73] Assignee: Dana Corporation, Toledo, Ohio

[21] Appl. No.: 09/148,446

[22] Filed: Sep. 4, 1998

[51] Int. Cl.[6] .................................................. F16H 63/38
[52] U.S. Cl. ...................................... 475/230; 403/359.5
[58] Field of Search ......................... 475/230; 403/359.1, 403/359.5

[56] References Cited

U.S. PATENT DOCUMENTS

| | | | |
|---|---|---|---|
| 3,106,416 | 10/1963 | Kootnz | 287/100 |
| 3,651,713 | 3/1972 | Mueller | 74/713 |
| 3,822,951 | 7/1974 | Bornzin | 403/316 |
| 4,859,110 | 8/1989 | Dommel | 403/325 |
| 4,957,387 | 9/1990 | Nasu | 403/322 |
| 4,960,344 | 10/1990 | Geisthoff et al. | 403/316 |
| 5,141,355 | 8/1992 | Stillwagon | 403/325 |

*Primary Examiner*—Dirk Wright
*Attorney, Agent, or Firm*—Oldham & Oldham Co., LPA

[57] ABSTRACT

The drive axles of a motor vehicle differential assembly are secured within the central bores provided in the side gears of the differential assembly by a spherical retention means which preferably is a metal ball that is securely held within a spherically-hollowed region created through the communication of a spherical bore provided in the splined end portions of the drive axles and a spherically-walled end portion of an elongated cavity provided in the splined central bores of the side gears. The spherically-walled end portion communicates with a cylindrically-walled region of the elongated cavity that facilitates insertion of the retention means into the elongated cavity.

5 Claims, 2 Drawing Sheets

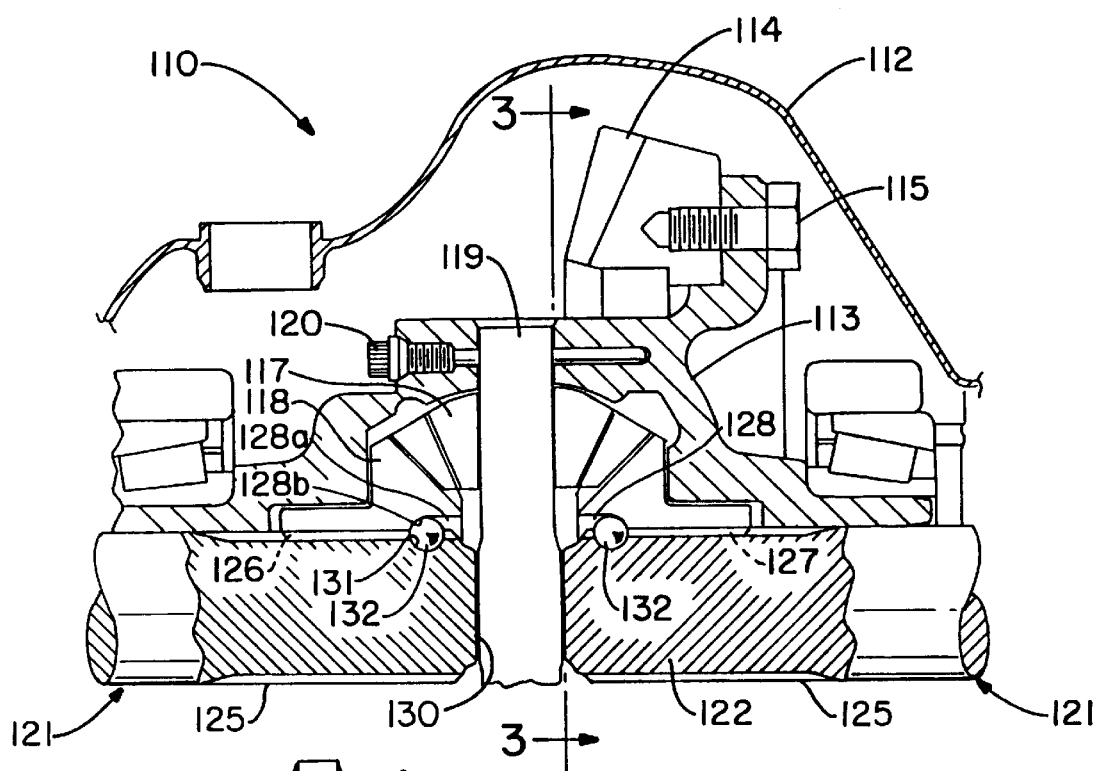
FIG.-2
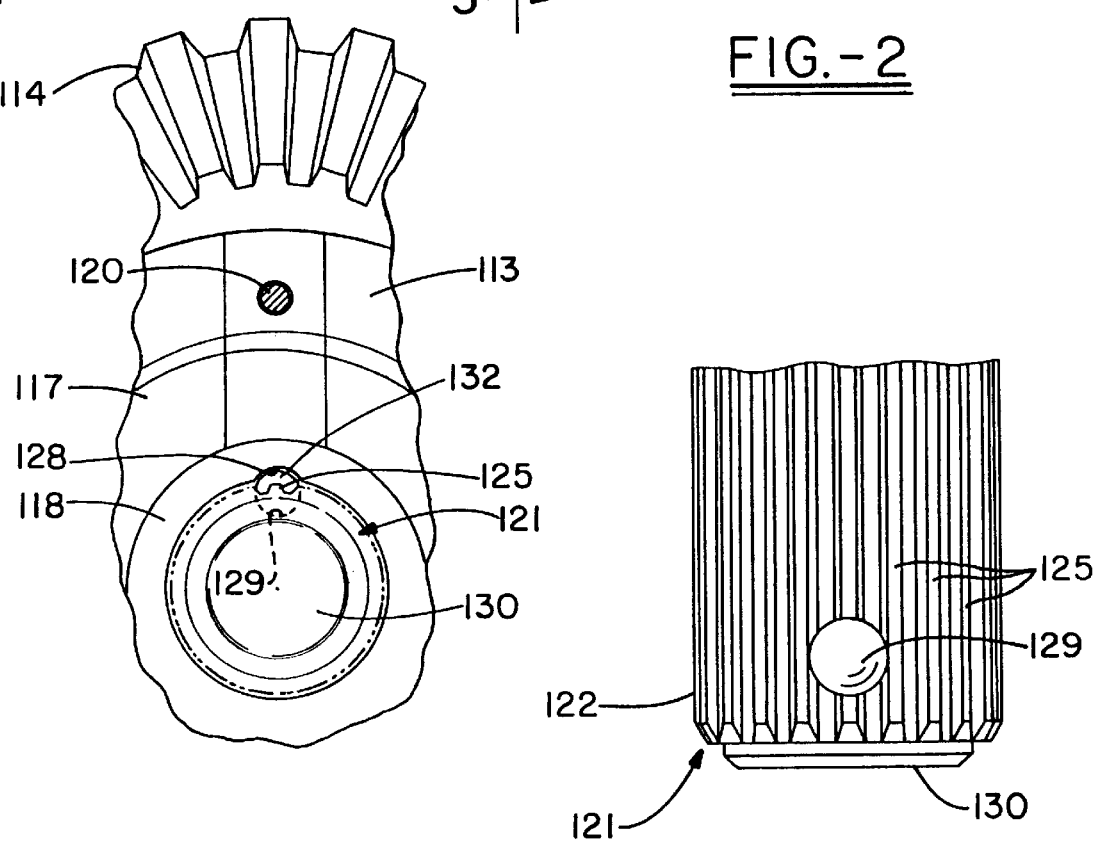
FIG.-3
FIG.-4

AXLE SHAFT BALL RETAINER

The present invention relates generally to motor vehicle differential assemblies and more particularly, to a new and novel means for retaining the ends of the drive axle shafts within a differential assembly. The invention is beneficial in instances where clearances between certain moving components of the assembly are very close.

BACKGROUND OF THE INVENTION

Motor vehicle differential assemblies have been in common use for many years to allow one motor vehicle wheel on an axle to rotate at a different rate than the other motor vehicle wheel, such as would occur when a motor vehicle is turning, or two tires having different diameters are being used on the same axle.

A typical motor vehicle differential assembly includes a pair of meshing spider and side gears enclosed in a differential case. The case is usually a one-piece unit, having a ring gear bolted to the case. The case is usually made of cast iron. The spider gears, typically made of hardened steel, are held in place by a steel shaft, known as a pinion shaft, which passes through the differential case and the center of the spider gears. The spider gears, also commonly made of hardened steel, mesh with the side gears. When the ring gear and the differential case turn, the spider and side gears also turn. Power flow is through the case, into the spider gears, and on into the side gears. The side gears are splined to a pair of drive axles and transfer power to the drive axles which in turn transfer power to wheels which drive the vehicle.

Known prior art means for keeping the drive axles firmly engaged within the side gears include C-locks which are received by a circumferential groove provided in the end of the drive axle and which project radially beyond the periphery of the drive axle to contact a nearby face of the side gear. The C-lock has been known to work satisfactorily as long as the arrangement of the spider gears and the side gears provides a wide enough space between the side gear face and the pinion shaft to achieve adequate button thickness on the end of the drive axle where the groove for the C-lock is provided. Where the spider gear and side gear arrangement does not yield enough space to realize appropriate button thickness, alternate means of retaining the drive axles are required.

Another known retention means makes use of a cam plug and a set of balls mounted within an axially disposed recess at the end of the drive axle. Rotation of the pinion gear shaft moves the cam plugs further into the recess and the balls outwardly into locking engagement with an annular recess within the side gears. The pinion shaft is then secured against rotation by a pin or screw which extends therethrough.

The present invention achieves the same results as the above described known retention means using the cam plug and balls; but, with a greatly simplified design that is envisioned to provide a stronger link between the side gears and the drive shafts.

SUMMARY OF THE INVENTION

It is therefore an advantage of the present invention to provide a new and improved means for retention of a drive axle within a motor vehicle differential assembly, particularly in situations where traditional means such as C-locks cannot be employed. This advantage is provided by encasing a metal ball in a spherically-hollowed region situated between the interface of the splined end portions of the drive axles and the splined cylindrical bores of the side gears. The spherically-hollowed region is created by combining a spherical bore provided in the splined drive axle end portions with a spherically-walled end portion of an elongated cavity provided in the splined cylindrical bores.

This advantage and other novel features of the present invention will become apparent in the following detailed description of the invention when considered in conjunction with the accompanying drawings.

BRIEF DESCRIPTION OF THE DRAWINGS

A better understanding of the present invention will be had when reference is made to the accompanying drawings, wherein identical parts are identified by identical reference numerals and wherein:

FIG. 2 is a partial top sectional view of a motor vehicle differential assembly of the present invention.

FIG. 3 provides a view of the present invention taken along line 3—3 of FIG. 2.

FIG. 4 provides an enlarged side view of a drive axle of the present invention.

DETAILED DESCRIPTION OF THE PRESENT INVENTION

Figure 1:
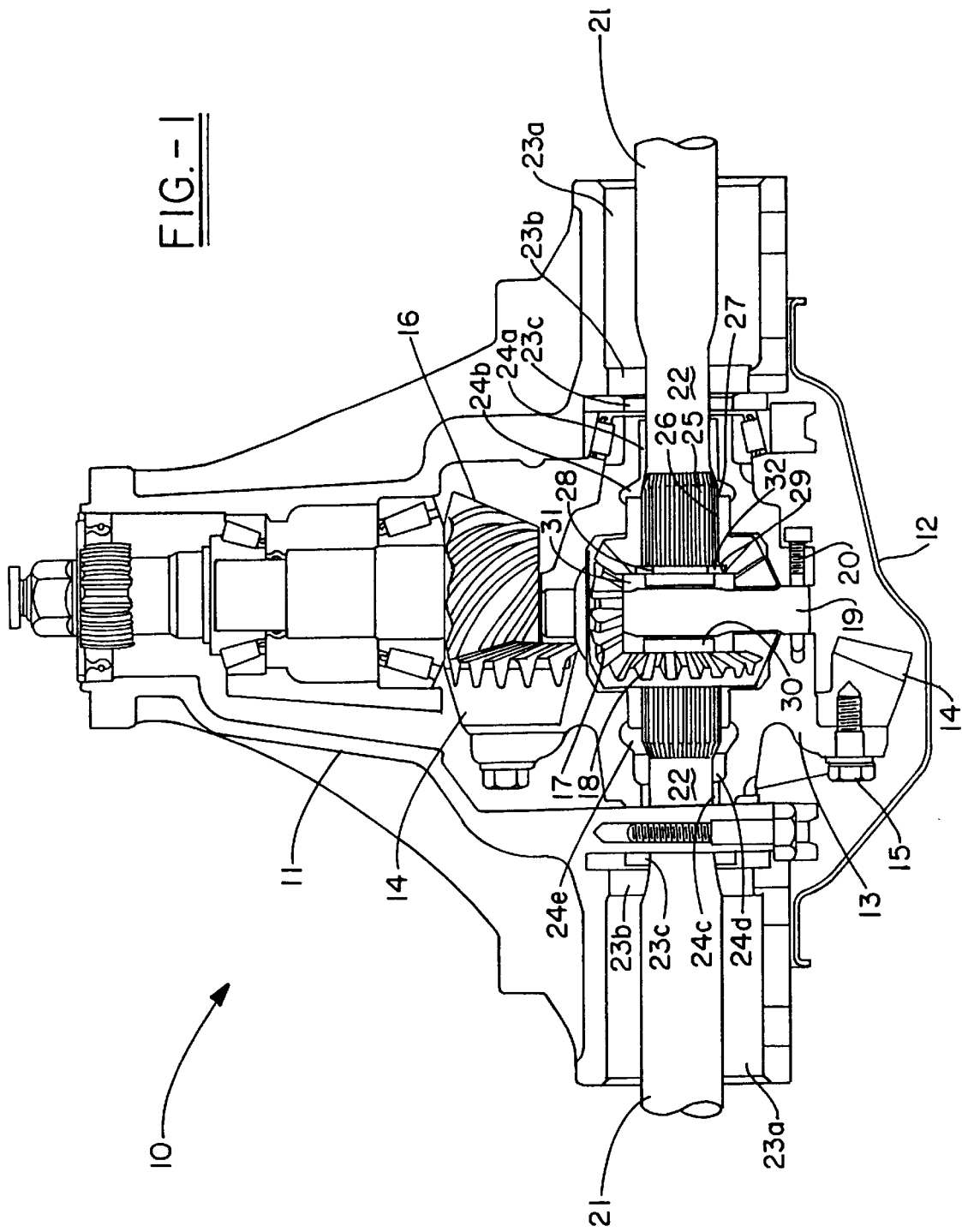
FIG. 1 is a top sectional view of a typical motor vehicle differential assembly employing a well known means for retaining drive axles.

FIG. 1 provides a top sectional view of a conventional motor vehicle differential assembly designated generally by the reference numeral 10. A review of FIG. 1 will show that the assembly 10 is comprised of a differential carrier 11 and a differential cover 12, within which is situated a differential case 13. The differential case 13 contains a ring gear 14 that is bolted to the differential case 13 by a ring gear bolt 15. Also situated within the differential case 13 is: a drive pinion gear 16 which mechanically meshes with the ring gear 14; a pair of spider gears 17; a pair of side gears 18 that mesh with the pair of spider gears 17; a pinion shaft 19 that connects the pair of spider gears 17; a threaded lock screw 20 that is received by bores in the differential case 13 and by a bore in the pinion shaft 19 in such manner as to secure the shaft 19 from axial and rotational movement; a pair of drive axles 21, each of which have end portions 22 that are received by a series of axially connected, generally cylindrical passageways 23a, 23b and 23c provided in the differential carrier 11 and passageways 24a, 24b, 24c, 24d, and 24e in the differential case 13. The end portions 22 of the drive axles 21 are provided with a plurality of radially projecting splines 25 that engage a corresponding plurality of splines 26 which is provided about the periphery of a central bore 27 in each of the side gears 18.

FIG. 1 further shows that at the innermost ends of the splines 25 on each of the end portions 22 of the drive axles 21 there is provided a circumferential groove 28 and that at the innermost ends of the splines 26 provided in the bore 27 of each of the side gears 18 there is provided a shallow counterbore 29. Each of the circumferential grooves 28 serve to define a button-like end 30 on each of the drive axles 21. The button-like ends 30 project inwardly beyond the inner hub portion of each of the side gears 18 and either make contact, or come very near to making contact, with the pinion shaft 19. By so extending, the button-like ends 30 define a pair of annular spaces 31. In order that the end portions 22 of the drive axles 21 will remain engaged in the bores 27 of the side gears 18, a ring-like drive axle C-lock 32 is provided in each of the circumferential grooves 28. Dimensionally, the C-lock 32 has an outside diameter and a thickness that substantially match the diameter and depth of the counterbore 29 provided in the bore 27. By engaging the circumferential grooves 28 and the base of the counterbores 29, the C-locks 32 act to resist axial movement of the end portions 22 and to thereby retain the drive axles 21 in the bores 27 so that they will receive driving torque.

Usage of the C-locks 32 to retain the drive axles 21 has been known to work well where the arrangement of the spider gears 17 and the side gears 18 causes each of the annular spaces 31 to be wide enough to allow for the button-like ends 30 to have a thickness which will be adequate to resist shearing forces tending to expel the drive axles 21 from the differential assembly 10. Where the need to achieve certain vehicle performance requirements causes the annular spaces 31 to become so thin that adequate thickness of the button-like ends 30 cannot be provided, alternative means for retaining the drive axles 21 are necessary.

FIG. 2 provides a partial top sectional view of a vehicle differential assembly 110 of the present invention. Like the conventional differential assembly 10, the assembly 110 of the present invention is comprised of: a differential cover 112; a differential case 113 situated within the cover 112; a ring gear 114; a ring gear bolt 115 that fastens the ring gear to the differential case 113; a pair of spider gears 117 (only one of the gears is shown in FIG. 2); a pair of side gears 118 that mesh with the spider gears 117; a pinion shaft 119 that connects the spider gears 117; a lock screw 120 received by bores in the differential case 113 and a bore in the pinion shaft 119 to secure the shaft 119 from axial and rotational motion; and a pair of drive axles 121. Each of the drive axles 121 has an end portion 122 which is provided with a plurality of radially projecting splines 125 that engage a corresponding plurality of splines 126 provided about the inside surface of a central bore 127 extending through each of the side gears 118.

With reference to FIG. 2 and to FIG. 3 which provides a view along line 3—3 of FIG. 2, it will be noted that each of the side gears 118 is provided with an elongated cavity 128 in the end of central bore 127 that is closest to the pinion shaft 119. The cavity 128, when viewed from the inner face of the side gear 118 (FIG. 3), has a crescent-like cross section, and when observed longitudinally from a sectional view of the side gear 118 (FIG. 2), the cavity 128 has a cylindrically-walled first portion 128a that extends perpendicularly away from the shaft 119 and into the inner face of the side gear 118. The cylindrically-walled portion 128a communicates with a spherically-walled second portion 128b that serves as a closure for the elongated cavity 128 when the splined portions of the drive axle 121 the side gear 118 are engaged.

FIG. 4 provides an enlarged side view of part of the end portion 122 of drive axle 121 as it would appear when disengaged from the side gear 118. In addition to showing a portion of the radially extending splines 125 that surround the drive axle 121 at the end portion 122, FIG. 4 also shows that a spherical bore 129 is provided in the outer cylindrical surface of the end portion 122. As may be seen by reference to FIGS. 2 and 3, the spherical bore 129 extends radially inward toward the rotational axis of drive axle 121, and it is located just inwardly of the end face 130 so that when the end portion 122 is fully inserted into the central bore 127 of side gear 118 the bore 129 communicates with the spherically-walled portion 128b of the elongated cavity 128 and thus expands portion 128b to form a larger spherically-hollowed region 131 that is capable of receiving a metal ball 132 having a diameter that is sufficiently large to allow it to fit securely in the region 131. When positioned within the region 131, as shown in FIG. 2, the ball 132 functions to retain the end portion 122 of the drive axle 121 within central bore 127 by preventing lateral movement of the end portion 122 toward the exterior of the differential assembly 110.

Insertion of the balls 132 into the regions 131 is accomplished before the differential assembly cover 112 and lock screw 120 have been applied to the differential assembly 110. Before application of these components, the pinion shaft 119 may be removed from the spider gears 117 by displacing it in a direction which would appear to be upward in FIG. 2. With the pinion shaft 119 so removed, the end portions 122 of the drive axles 121 may be slid one at a time into the void left by the pinion shaft 119 to expose the spherical bore 129. The ball 132 may then be inserted into the bore 129 and aligned with the elongated slot 128 provided in the central bore 127 of the side gear 118. Thereafter, the end portion 122 will be retracted into central bore 127 until the ball 132 contacts spherically-shaped wall 128b and thereby fills spherical region 131. After the foregoing steps have been completed for both of the end portions 122, the pinion shaft 119 may the be reinstated to its original position between the spider gears 117, the lock screw 120 may be inserted and secured into the bores provided in the differential case 113 and the pinion shaft 119, the differential cover 112 may be applied to the differential assembly 110.

While the above provided description of the invention shows each of the central bores 127 of the side gears 118 having only one elongated slot 128 and each of the end portions 122 of the drive axles 121 having only one corresponding spherical bore 129, it should be noted that each of the central bores 127 and the end portions 122 may also be provided with two or more elongated slots 128 and corresponding spherical bores 129 which may be equidistantly spaced about the periphery of each of the bores 127 and the ends 122. In such an event, a metal ball 132 will be provided for each of the slots 128 and corresponding bores 129, so as to provide additional retention strength for the drive axles 121.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A motor vehicle differential assembly comprised of:
    an outer differential carrier;
    a differential cover affixed to said outer differential carrier;
    a differential case enclosed by said outer differential carrier and said differential cover;
    a ring gear situated proximate to an interior wall of said differential case and secured to said wall by a fastening means;
    a pinion gear also located in said differential case and oriented at a right angle to said ring gear and mechanically engaging the teeth of said ring gear;
    a pinion shaft situated in said differential case such that one of its ends is proximate to said pinion gear and the other of its ends is directed towards said differential cover;
    a pair of spider gears positioned in parallel fashion on opposing end regions of said pinion shaft by means of a central bore provided through each of said spider gears and oriented such that the teeth bearing surfaces of said spider gears are faced toward the central region of said pinion shaft;

a pair of side gears positioned parallel to one another and perpendicularly to said pair of spider gears, and further positioned so that the teeth bearing surfaces of said side gears are faced toward one another and are mechanically engaged with said pair of spider gears at diametrically opposed portions of the teeth bearing surfaces of said side gears;

a pair of drive axles received by said differential carrier and said differential case and having end portions provided with a plurality of radially projecting splines and at least one radially inward extending spherical bore, said end portions being received by a central bore provided through each of said side gears, said central bore having a plurality of splines provided about its inside surface, which are engaged by said plurality of radially extending splines provided on said end portion, and said central bore further having at least one elongated cavity situated in the end of said central bore that is closest to said pinion shaft and communicating with said at least one spherical bore in said end portions of said pair of drive axles; and a spherical retaining means encased within said at least one elongated cavity and said at least one spherical bore where said cavity and said spherical bore communicate.

2. A motor vehicle differential assembly as claimed in claim 1, wherein the said at least one elongated cavity is defined by a crescent-like, cylindrically-walled first portion that extends perpendicularly away from said pinion shaft and into the inner face of each of said side gears and is further defined by a spherically-walled second portion that is in communication with said cylindrically-walled first portion at its innermost longitudinal extremity and thereby serves to define an end closure for said elongated cavity.

3. A motor vehicle differential assembly as claimed in claim 2, wherein said at least one radially inward extending spherical bore is situated on said end portions of said drive axles so that when said end portions are fully engaged in said central bore provided through each of said side gears said spherical bore communicates with said spherically-walled second portion of said elongated cavity to form a larger spherically-hollowed region capable of receiving said spherical retaining means.

4. A motor vehicle differential assembly as claimed in claim 3, wherein said spherical retaining means is a metal ball having a diameter sufficient to allow said ball to be securely encased within said larger spherically-hollowed region and to thereby retain said end portions of said drive axles in said side gears.

5. A method for securing a pair of drive axles in a motor vehicle differential assembly, the method comprising the steps of:

removing a pinion shaft from the central bore of each of a pair of spider gears positioned in parallel fashion on opposing ends of said pinion shaft and located within a differential case;

making accessible a spherical bore provided on the end portion of each of said drive axles by alternately sliding said end portions of said drive axles into a void space created by removing said pinion shaft and from a central bore provided in each of a pair of side gears which are positioned parallel to one another and perpendicularly to said spider gears;

depositing a spherical retaining means in said spherical bore;

aligning said spherical retaining means with an elongated cavity provided in said central bore, retracting said end portion from said void space and into said central bore so that said spherical retaining means is received by said elongated cavity; and reinstating said pinion shaft to its original position in the central bore of each of said pair of spider gears.

* * * * *